United States Patent
Jordan (10) Patent No.: US 9,519,360 B2
(45) Date of Patent: Dec. 13, 2016

(54) PALM REJECTION VISUALIZATION FOR PASSIVE STYLUS

(71) Applicant: Synaptics Incorporated, San Jose, CA (US)

(72) Inventor: Joel Jordan, San Jose, CA (US)

(73) Assignee: Synaptics Incorporated, San Jose, CA (US)

( * ) Notice: Subject to any disclaimer, the term of this patent is extended or adjusted under 35 U.S.C. 154(b) by 70 days.

(21) Appl. No.: 14/567,947

(22) Filed: Dec. 11, 2014

(65) Prior Publication Data

US 2016/0170505 A1 Jun. 16, 2016

(51) Int. Cl.
*G06F 3/0354* (2013.01)
*G06F 3/0488* (2013.01)
*G06F 3/041* (2006.01)
*G06F 3/044* (2006.01)

(52) U.S. Cl.
CPC .......... *G06F 3/03545* (2013.01); *G06F 3/044* (2013.01); *G06F 3/0416* (2013.01); *G06F 3/0488* (2013.01)

(58) Field of Classification Search
CPC .. G06F 3/0418; G06F 3/04883; G06F 3/0416; G06F 2203/04104; G06F 3/0412; G06F 3/044; G06F 3/03545; G06F 2203/04106; G06F 3/0354; G06F 3/041
See application file for complete search history.

(56) References Cited

U.S. PATENT DOCUMENTS

| | | | |
|---|---|---|---|
| 7,928,764 B2 | 4/2011 | Yu et al. | |
| 8,018,440 B2 | 9/2011 | Townsend et al. | |
| 8,493,359 B2 | 7/2013 | Wright et al. | |
| 8,521,791 B2 | 8/2013 | Chen et al. | |
| 8,587,526 B2 | 11/2013 | Engelhardt et al. | |
| 2009/0095540 A1 | 4/2009 | Zachut et al. | |
| 2010/0026655 A1 | 2/2010 | Harley | |
| 2010/0053095 A1 | 3/2010 | Wu et al. | |
| 2010/0308844 A1 | 12/2010 | Day et al. | |
| 2011/0012855 A1 | 1/2011 | Yeh et al. | |
| 2012/0182238 A1* | 7/2012 | Lee | G06F 3/0418 345/173 |
| 2012/0262407 A1* | 10/2012 | Hinckley | G06F 3/038 345/173 |
| 2012/0306744 A1 | 12/2012 | Hoffman et al. | |
| 2013/0257748 A1* | 10/2013 | Ambrus | G02B 27/0093 345/173 |
| 2013/0265271 A1 | 10/2013 | Hsu et al. | |
| 2013/0300696 A1 | 11/2013 | Haran et al. | |
| 2014/0108979 A1* | 4/2014 | Davidson | G06F 3/0481 715/765 |

* cited by examiner

*Primary Examiner* — Md Saiful A Siddiqui
(74) *Attorney, Agent, or Firm* — Osha Liang LLP (57) ABSTRACT

A processing system for a capacitive sensing device has a sensor module with sensor circuitry coupled to sensor electrodes, the sensor module drives the sensor electrodes for capacitive sensing, and a determination module to detect input objects in a sensing region of the capacitive sensing device, enter a pen mode based on detecting a condition, determine, responsive to entering the pen mode, exclusion data based on at least the one input object. An exclusion region is displayed by a host device, the exclusion region is based on the exclusion data and includes a portion of the sensing region with diminished detectability of an input object.

15 Claims, 4 Drawing Sheets

PALM REJECTION VISUALIZATION FOR PASSIVE STYLUS

BACKGROUND

As the sophistication of new devices increases, designers and developers are recognizing that usability is a critical element of any successful product. Almost no users of a given device or application take the time to stop and read the instructions, if any instructions are even included. Many users also have expectations of how certain devices or applications should perform—whether or not that is how the device or application is designed to operate. When a device or application behaves unusually, even if only in certain situations, users may become frustrated and stop using the device or application, or even find a similar substitute device or application to use instead.

SUMMARY

In general, in one aspect, the invention relates to a processing system for a capacitive sensing device, comprising: a sensor module comprising sensor circuitry coupled to a plurality of sensor electrodes, the sensor module configured to drive the plurality of sensor electrodes for capacitive sensing; and a determination module configured to: detect a first input object and a second input object in a sensing region of the capacitive sensing device; enter a pen mode based on detecting a first condition; determine, responsive to entering the pen mode, exclusion data based on at least the second input object; and wherein an exclusion region is displayed by a host device, the exclusion region based on the exclusion data and comprising a portion of the sensing region with diminished detectability of the first input object.

In general, in one aspect, the invention relates to an input device system, comprising: a display device; a plurality of sensor electrodes; and a processing system, the processing system coupled to the sensor electrodes and the display device, the processing system configured to: drive the plurality of sensor electrodes to detect a first input object and a second input object in a sensing region; enter a pen mode based on detecting a first condition; determining, responsive to entering the pen mode, exclusion data based on at least the second input object; and outputting an exclusion region on the display device, the exclusion region based on the exclusion data and comprising a portion of the sensing region with diminished detectability of the first input object.

In general, in one aspect, the invention relates to a method for capacitive sensing, comprising: detecting a first input object and a second input object in a sensing region of a capacitive sensing device; entering a pen mode based on detecting a first condition; determining, responsive to entering the pen mode, exclusion data based on at least the second input object; and wherein an exclusion region is displayed by a host device, the exclusion region based on the exclusion data and comprising a portion of the sensing region with diminished detectability of the first input object while in the pen mode.

Other aspects and advantages of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a processing system, input device system, and a method for palm rejection visualization for passive stylus. Specifically, input objects are detected. The input objects may be, for example, a palm of a user and a passive pen. A pen mode is entered, in response to a condition and, an exclusion region is reported. The exclusion region is an area of a sensor with diminished detectability of the passive pen. The exclusion region may then be displayed by the device, enabling a user to determine when the passive pen may not work as expected. Throughout this detailed description the terms "passive pen" and "passive stylus" may be used interchangeably and such use shall be deemed equivalent and not be deemed as ambiguous or indefinite.

Figure 1:
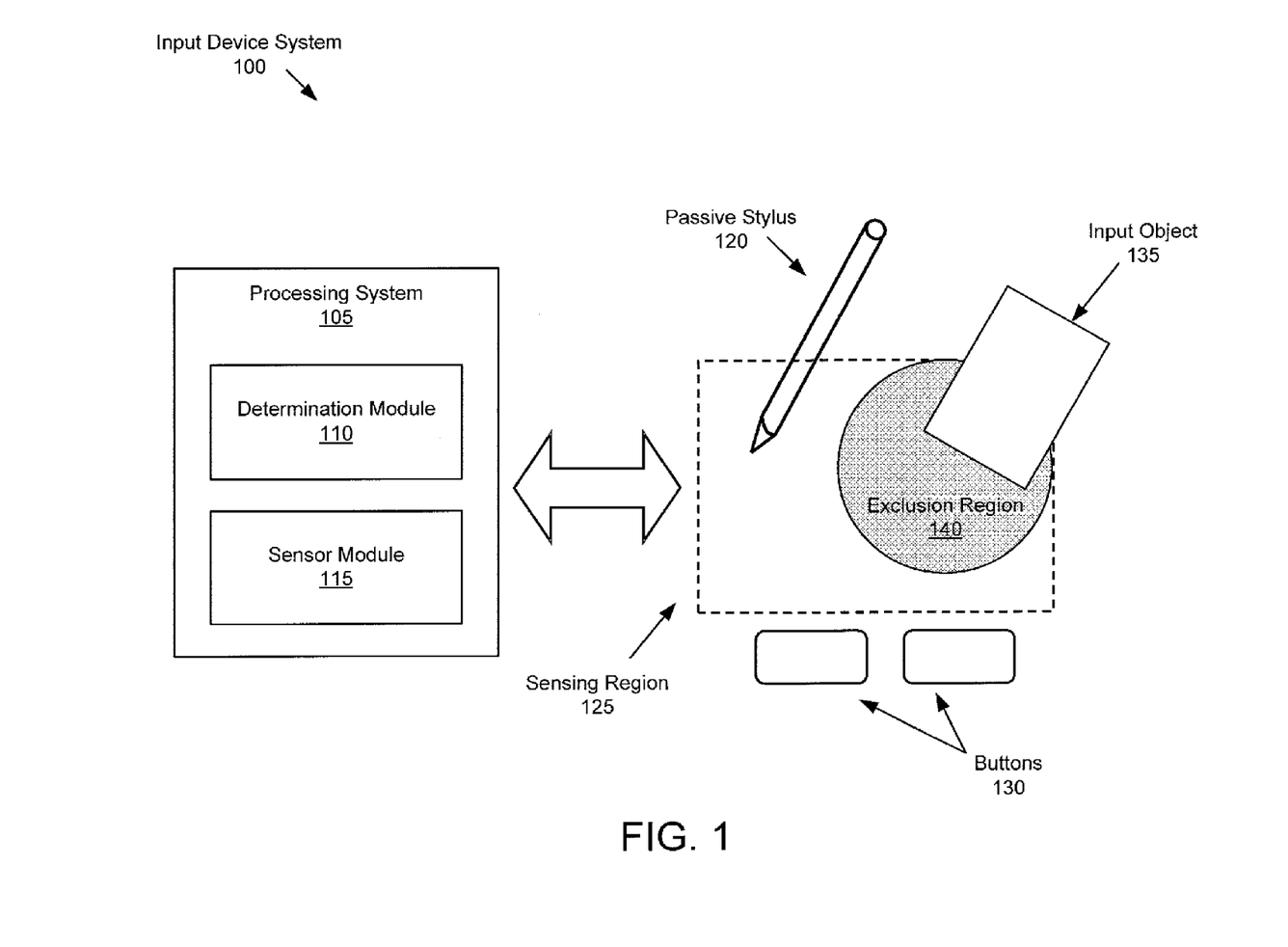
FIG. 1 shows a schematic diagram in accordance with one or more embodiments of the invention.

Turning now to the figures, FIG. 1 is a block diagram of an exemplary input device system (100), in accordance with embodiments of the invention. The input device system (100) may be configured to provide input to an electronic system (not shown), such as a host device. As used in this document, the term "electronic system" (or "electronic device" or "host device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device system (100) and separate joysticks or key switches. Further example electronic systems may include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device system (100). In some embodiments, the input device system (100) may include the host device as well, which may process input data in a variety of ways. For example, a capacitive sensing device may comprise capacitive sensing electrodes, a host device, and one or more processing systems for performing capacitive sensing and operating various aspects of the host device.

The input device system (100) may be implemented as a physical part of the electronic system, or may be physically separate from the electronic system. As appropriate, the input device system (100) may communicate with parts of the electronic system using any one or more of the following: buses, networks, and other wired or wireless interconnections. Examples include I2C, SPI, PS/2, Universal Serial Bus (USB), Bluetooth, RF, and IRDA.

In some embodiments, input device system (100) includes a passive stylus (120) and/or an input object (135). Passive stylus (120) may be any type of passive stylus/pen. Typically, passive stylus (120) is shaped similar to an ordinary pen, with a narrow tip on one end, although passive stylus (120) may take any form or shape. Passive stylus (120) may be used by a user to interact with sensing region (125), including such interactions as touching the tip to the sensing region (125) (such as a touchscreen) to write letters, make selections, or perform other actions. The narrow tip of passive stylus (120) may enable precise determinations of position, movement, force, etc., to be detected by sensing region (125). In one or more embodiments, the tip (or portion touching the sensing region) of the passive stylus (120) is smaller than the pixel size of the sensing region. For example, if the layout of the sensing region involves pixels with a size of 4 mm by 4 mm, then the portion of the stylus than contacts the sensing region may be smaller than 4 mm by 4 mm (e.g., 2 mm, 3 mm, etc.).

In one or more embodiments, input object (135) may be any other input object, such as a finger, thumb, palm, forearm, inanimate object, etc. In one or more embodiments of the invention, input object (135) is larger than passive stylus (120), and therefore may create a large signal in the sensing region, causing passive stylus (120) to have diminished detectability in certain portions of the sensing region (125). It will be apparent to one of ordinary skill in the art, having the benefit of this disclosure, that there are many different forms, shapes, and types of objects that may be a passive stylus (120) and/or an input object (135) and, as such, the invention should not be limited to the above examples.

In one or more embodiments, the input device system (100) is a proximity sensor device (also often referred to as a "touchpad", "touch screen", or a "touch sensor device") configured to sense input provided by the passive stylus (120) in a sensing region (125). In one or more embodiments, sensing region (125) encompasses any space above, around, in and/or near the input device system (100) in which the input device system (100) is able to detect input (e.g., input provided by passive stylus (120) and/or input object (135)). The sizes, shapes, and locations of particular sensing regions may vary widely from embodiment to embodiment. In some embodiments, the sensing region (125) extends from a surface of the input device system (100) in one or more directions into space until signal-to-noise ratios prevent sufficiently accurate detection. The distance to which this sensing region (125) extends in a particular direction, in various embodiments, may be on the order of less than a millimeter, millimeters, centimeters, or more, and may vary significantly with the type of sensing technology used and the accuracy desired. Thus, some embodiments sense input that includes no contact with any surfaces of the input device system (100), contact with an input surface (e.g. a touch surface) of the input device system (100), contact with an input surface of the input device system (100) coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region (125) has a rectangular shape when projected onto an input surface of the input device system (100).

The input device system (100) may utilize any combination of sensor components and sensing technologies to detect user input in the sensing region (125). The input device system (100) includes one or more sensing elements for detecting user input. As several non-limiting examples, the input device system (100) may use capacitive, elastive, resistive, inductive, magnetic, acoustic, ultrasonic, radio frequency (RF) waves, and/or optical techniques.

Some implementations are configured to provide images that span one-, two-, three-, or higher dimensional spaces. Some implementations are configured to provide projections of input along particular axes or planes.

In some resistive implementations of the input device system (100), a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device system (100), one or more sensing elements pick up loop currents induced by a resonating coil or pair of coils. Some combination of the magnitude, phase, and frequency of the currents may then be used to determine positional information.

In some capacitive implementations of the input device system (100), voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes") and one or more receiver sensor electrodes (also "receiver electrodes"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may include effect(s) corresponding to one or more transmitter signals, and/or to one or more sources of environmental interference (e.g. other electromagnetic signals). Sensor electrodes may be dedicated transmitters or receivers, or may be configured to both transmit and receive.

Some optical techniques utilize optical sensing elements (e.g., optical transmitters and optical receivers). Such optical transmitters transmit optical transmitter signals. The optical receivers include functionality to receive resulting signals from the optical transmitter signals. A resulting signal may include effect(s) corresponding to one or more transmitter signals, one or more active pen (120) in the sensing region, and/or to one or more sources of environmental interference. For example, the optical transmitters may correspond to a light emitting diode (LED), organic LED (OLED), light bulb, or other optical transmitting component. In one or more embodiments, the optical transmitter signals are transmitted on the infrared spectrum.

In FIG. 1, a processing system (105) is shown as part of the input device system (100). The processing system (105) is configured to operate the hardware of the input device system (100) to detect input in the sensing region (125). The processing system (105) includes parts of or all of one or more integrated circuits (ICs) and/or other circuitry components. For example, a processing system for a mutual capacitance sensor device may include transmitter circuitry configured to transmit signals with transmitter sensor electrodes, and/or receiver circuitry configured to receive signals with receiver sensor electrodes). In some embodiments, the processing system (105) also includes electronically-readable instructions, such as firmware code, software code, and/or the like. In some embodiments, components composing the processing system (105) are located together, such as near sensing element(s) of the input device system (100). In other embodiments, components of processing system (105) are physically separate with one or more components close to sensing element(s) of input device system (100), and one or more components elsewhere. For example, the input device system (100) may be a peripheral coupled to a desktop computer, and the processing system (105) may include software configured to run on a central processing unit of the desktop computer and one or more ICs (perhaps with associated firmware) separate from the central processing unit. As another example, the input device system (100) may be physically integrated in a phone, and the processing system (105) may include circuits and firmware that are part of a main processor of the phone. In some embodiments, the processing system (105) is dedicated to implementing the input device system (100). In other embodiments, the processing system (105) also performs other functions, such as operating display screens, driving haptic actuators, etc.

The processing system (105) may be implemented as a set of modules that handle different functions of the processing system (105). Each module may include circuitry that is a part of the processing system (105), firmware, software, or a combination thereof. In various embodiments, different combinations of modules may be used. For example, as shown in FIG. 1, the processing system (105) may include a determination module (110) and a sensor module (115). In one or more embodiments, functionality of the determination module (110) and the sensor module (115) may be performed, in whole or in part, by the processing system (105), or alternatively a host to device to which the processing system (105) typically reports touch data. For example, the processing system (105) may report touch data to the host device while the host device performs further analysis of the touch data and takes related actions.

In one or more embodiments, determination module (110) includes functionality to detect input objects, change modes of operation, and report an exclusion region. Determination module (110) may detect input objects based on the information provided by the sensor module (115) or other suitable component. For example, if an object is present in sensing region (125), determination module (110) may identify position of the object(s) and/or the boundaries of the object(s), identify the size of the object(s), and/or determine a type of object based on the available information. In one or more embodiments of the invention, determination module (110) is able to identify whether an input object is a passive stylus or some other object, such as a palm. It will be apparent to one of ordinary skill in the art, having the benefit of this disclosure, that there are many ways for determination module (110) to detect input objects and, as such, the invention should not be limited to the above examples.

In one or more embodiments, determination module (110) includes functionality to change modes of operation. The modes of operation may relate to an expected type of input object, such as a passive stylus or a finger. If determination module (110) is expecting a passive stylus to be present near a sensing region, then the determination module (110) may enter a pen mode. Alternatively, if determination module (110) is not expecting a passive stylus to be present, a different mode may be entered, such as finger mode.

Any number of modes is possible, dependent on the particular configuration of determination module (110), the host device, or any other suitable component. In one or more embodiments, determination module (110) may transition between modes based on a condition such as: number of input objects detected, type of input objects detected, presence of a passive stylus, execution of an application on the host device, direct user input, or any other suitable condition. It will be apparent to one of ordinary skill in the art, having the benefit of this disclosure, that there are many potential modes and many conditions to cause a mode to be entered and, as such, the invention should not be limited to the above examples.

In one or more embodiments, determination module (110) includes functionality to report exclusion region (140) to any suitable component, such as a host device. In other embodiments, the determination module reports touch data to a host device and the host device calculates the exclusion region (140). Exclusion region (140) is a region of sensing region (125) in which passive stylus (120) has diminished detectability by input device system (100). In other words, if passive stylus (120) is used within the exclusion region (140) the use may not be detected, and the user may experience unusual or erratic behavior. If input object (135) causes a strong capacitive sensing signal, it may be difficult to properly detect the passive stylus (120) near the input object (135). Exclusion region (140) may be of any shape, and any size, such as a square, circle, oval, rectangle, etc. In one or more embodiments of the invention, exclusion region (140) is influenced by the size and strength of input object (135). For example, if an input object causes a large response within the sensing region (125), then the exclusion region may be comparatively larger to an exclusion region related to an input object that is small and causes a small response. In other words, exclusion region (140) may be shaped based on the shape of the input object that is related to the exclusion region. In one or more embodiments, exclusion region (140) may be influenced by the layout of the sensor electrodes of the capacitive sensing device.

In one or more embodiments, there may be any number of exclusion regions. The exclusion region (140) may be displayed on a display (not shown) of the host device, or may be displayed on any other suitable device, using any suitable component and/or method. In one or more embodiments, the exclusion region (140) may be displayed as a partially transparent area. Alternatively, the exclusion region (140) may be displayed as a completely opaque area, or any other suitable level of visibility. In one or more embodiments, exclusion region (140) may be displayed using any color, such as grey, black, white, red, blue, yellow, etc. Additionally, exclusion region (140) may be shown using any other suitable queues, such as dots, stripes, sounds, etc. It will be apparent to one of ordinary skill in the art, having the benefit of this disclosure, that there are many ways to show an exclusion region and, as such, the invention should not be limited to the above examples.

In general, in one or more embodiments, a passive stylus may report a peak response amplitude of 10% to 30% of what a finger or palm may report. In some embodiments, low ground mass effects may also distort the signal of a passive stylus, in addition to other input objects such as a finger or hand. The pixel size of the sensing device may vary, for example from 4 mm to 7 mm, or any other suitable size. The pixel size may affect how far away the passive stylus (120) should be from the input object (135) in the sensing region while still being able to detect the passive stylus (120) reliably. In one or more embodiments, the signal from the passive stylus degrades within 2 sensor pitches of the edge of the other input object. These, and other factors, may be considered when determining the exclusion region (140). It will be apparent to one of ordinary skill in the art, having the benefit of this disclosure, that there are many different types of sensors and, as such, the invention should not be limited to the above examples.

Returning to determination module (110), the exclusion region (140) may be reported to a host device, or other suitable component or device, in any manner now known or later developed. Specifically, the exclusion region (140) may be reported as a bitmap where each pixel is either a 0 or a 1, and with a 1 indicating that a pixel belongs to the exclusion region. Alternatively, an exclusion region may be reported using any other format and/or method. As previously discussed, the processing system (105) may instead report touch pixel data, input object locations and characteristics, or other touch data to the host device leaving the host device to determine the exclusion region based on the touch data and possibly other related information from the processing system (105).

The sensor module (115) may include functionality to drive the sensing elements to transmit transmitter signals and receive resulting signals. For example, the sensor module (115) may include sensory circuitry that is coupled to the sensing elements. The sensor module (115) may include, for example, a transmitter module and a receiver module. The transmitter module may include transmitter circuitry that is coupled to a transmitting portion of the sensing elements. The receiver module may include receiver circuitry coupled to a receiving portion of the sensing elements and may include functionality to receive the resulting signals.

Although FIG. 1 shows only a determination module (110) and a sensor module (115), alternative or additional modules may exist in accordance with one or more embodiments of the invention. Such alternative or additional modules may correspond to distinct modules or sub-modules than one or more of the modules discussed above. Example alternative or additional modules include hardware operation modules for operating hardware such as sensor electrodes and display screens, data processing modules for processing data such as sensor signals and positional information, reporting modules for reporting information, and identification modules configured to identify gestures such as mode changing gestures, and mode changing modules for changing operation modes.

In some embodiments, the processing system (105) responds to user input (or lack of user input) in the sensing region (125) directly by causing one or more actions. Example actions include changing operating modes, as well as GUI actions such as cursor movement, selection, menu navigation, and other functions. In some embodiments, the processing system (105) provides information about the input to some part of the electronic system (e.g. to a central processing system of the electronic system that is separate from the processing system (105), if such a separate central processing system exists). In some embodiments, some part of the electronic system processes information received from the processing system (105) to act on user input, such as to facilitate a full range of actions, including mode changing actions and GUI actions.

For example, in some embodiments, the processing system (105) operates the sensing element(s) of the input device system (100) to produce electrical signals indicative of input (or lack of input) in the sensing region (125). The processing system (105) may perform any appropriate amount of processing on the electrical signals in producing the information provided to the electronic system. For example, the processing system (105) may digitize analog electrical signals obtained from the sensor electrodes. As another example, the processing system (105) may perform filtering or other signal conditioning. As yet another example, the processing system (105) may subtract or otherwise account for a baseline, such that the information reflects a difference between the electrical signals and the baseline. As yet further examples, the processing system (105) may determine positional information, recognize inputs as commands, recognize handwriting, and the like.

Continuing with FIG. 1, in some embodiments, the input device system (100) is implemented with additional input components that are operated by the processing system (105) or by some other processing system. These additional input components may provide redundant functionality for input in the sensing region (125), or some other functionality. FIG. 1 shows buttons (130) near the sensing region (125) that may be used to facilitate selection of items using the input device system (100). Other types of additional input components include sliders, balls, wheels, switches, and the like. Conversely, in some embodiments, the input device system (100) may be implemented with no other input components.

In some embodiments, the input device system (100) includes a touch screen interface, and the sensing region (125) overlaps at least part of an active area of a display screen. For example, the input device system (100) may include substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device system (100) and the display screen may share physical elements. For example, some embodiments may utilize some of the same electrical components for displaying and sensing. As another example, the display screen may be operated in part or in total by the processing system (105).

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system (105)). Additionally, the embodiments of the present invention apply equally regardless of the particular type of medium used to carry out the distribution. For example, software instructions in the form of computer readable program code to perform embodiments of the invention may be stored, in whole or in part, temporarily or permanently, on a non-transitory computer readable medium. Examples of non-transitory, electronically readable media include various discs, physical memory, memory, memory sticks, memory cards, memory modules, and or any other computer readable storage medium. Electronically readable media may be based on flash, optical, magnetic, holographic, or any other storage technology.

In one embodiment, a first set of sensor electrodes are arranged in a first direction, and a second set of sensor electrodes are arranged in a second direction substantially perpendicular to the first direction. It will be appreciated, however, that in various embodiments, a variety of sensor electrode patterns—including ones that vary in sensor electrode layout, size, shape, number, material, and the like—may be suitable in various embodiments.

Each of the first set of sensor electrodes may be ohmically isolated from each of the second set of sensor electrodes. In some embodiments, the first set and second set of sensor electrodes are disposed as a single layer of conductive material on a substrate that are connected by electrical jumpers as appropriate; the sensor electrodes of the first and second sets are separated from each other by local dispositions of insulative material disposed between the regions where the sensor electrodes of the first and second sets overlap each other. The insulative material may include one or more patches of insulative material that are printed, sputtered, or otherwise patterned. In some embodiments, the first and second sets of sensor electrodes are separated by one or more substrates. For example, the sensor electrodes of the first set of sensor electrodes may be disposed on a first surface of a substrate, and the sensor electrodes of the second set of sensor electrode may be disposed on a second, opposite surface of the same substrate. In other embodiments, the first and second sensor electrodes may be patterned on the same layer of a substrate. In such embodiments, the sensor electrodes do not cross over each other in the sensing region; any connections may be made in a border region, outside the sensing region. Further, in such an embodiment, various sensor electrode patterns and shapes may be used, each having various numbers of first and second sensor electrodes. As another example, the first and second sets of sensor electrodes may be disposed on different substrates that are laminated together.

In one embodiment, the sensor electrodes are constructed from opaque or substantially opaque conductive materials. In other embodiments, sensor electrodes are constructed in whole or in part from substantially transparent conductive material, such as patterned ITO, ATO, carbon nanotubes, or other substantially transparent materials.

In one embodiment, a first set of sensor electrodes are configured as receiver electrodes, and a second set of sensor electrodes are configured as transmitter electrodes. That is, the first and second sensor electrodes are communicatively coupled with a processing system that operates them to receive or transmit as appropriate. In some embodiments, the first and second sensor electrodes are also shaped for better performance as receiver or transmitter electrodes. The capacitive coupling between the transmitter electrodes and receiver electrodes change with input near the sensing region associated with sensor device.

Although not shown in FIG. 1, the processing system, the input device, and/or the host device may include one or more computer processor(s), associated memory (e.g., random access memory (RAM), cache memory, flash memory, etc.), one or more storage device(s) (e.g., a hard disk, an optical drive such as a compact disk (CD) drive or digital versatile disk (DVD) drive, a flash memory stick, etc.), and numerous other elements and functionalities. The computer processor(s) may be an integrated circuit for processing instructions. For example, the computer processor(s) may be one or more cores, or micro-cores of a processor. Further, one or more elements of one or more embodiments may be located at a remote location and connected to the other elements over a network. Further, embodiments of the invention may be implemented on a distributed system having several nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

Figure 2:
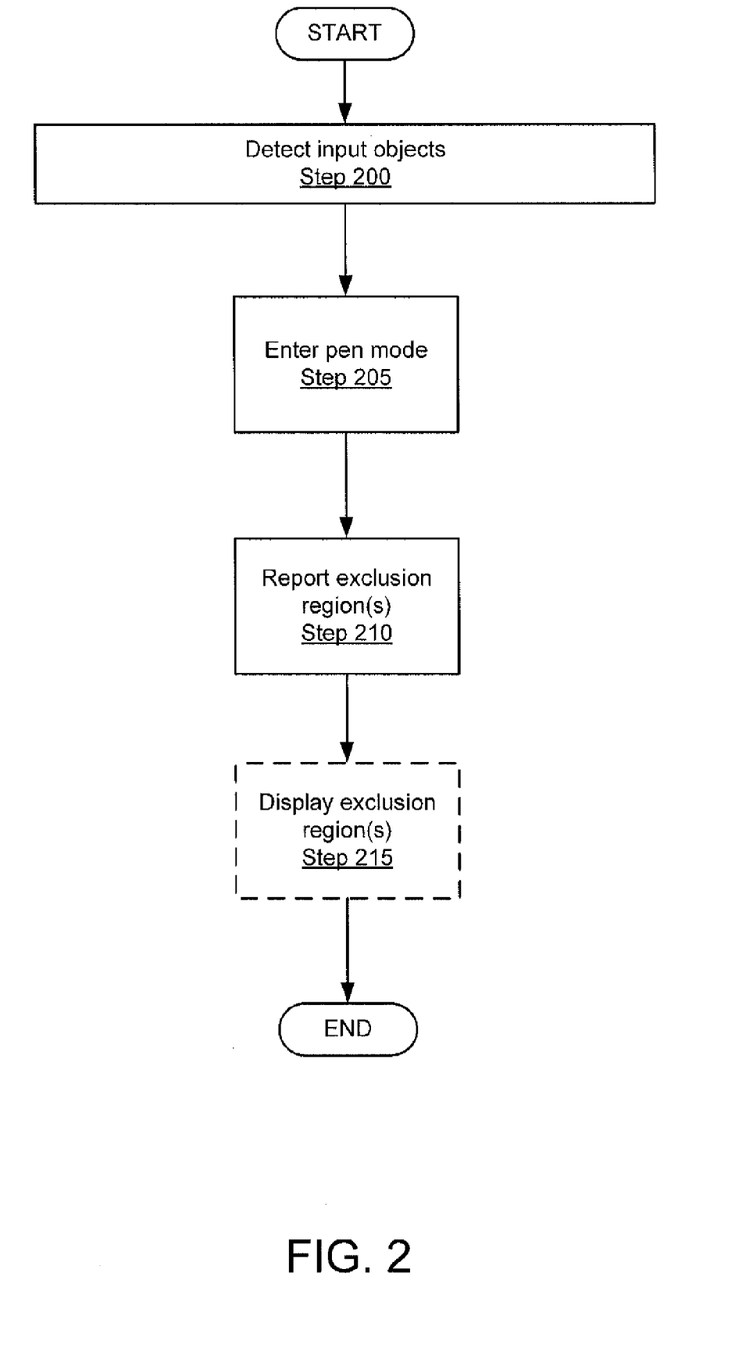
FIG. 2 shows a flowchart of a method in accordance with one or more embodiments of the invention.

FIG. 2 shows a flowchart of a method for palm rejection visualization for passive stylus. While the various steps in this flowchart are presented and described sequentially, one of ordinary skill in the art will appreciate that some or all of the steps may be executed in different orders and some or all of the steps may be executed in parallel. Further, in one or more embodiments of the invention, one or more of the steps described below may be omitted, repeated, and/or performed in a different order. Additionally, the steps described below need not be performed by only the processing system (105). For example, some of the steps may be performed by the processing system (105) while other steps are performed by a host device. Accordingly, the specific arrangement of steps shown in FIG. 2 should not be construed as limiting the scope of the invention.

In Step 200, input objects are detected within a sensing region, in accordance with one or more embodiments. The input objects may be detected in any manner now known or later developed. The input objects may be detected by any suitable type of sensor, such as a touchscreen. In one or more embodiments, one of the input objects may be a passive stylus. Other examples of input devices include, but are not limited to fingers, thumbs, hands, forearms, inanimate objects, etc.

In Step 205, pen mode is entered (i.e., the sensing region is placed in pen mode), in accordance with one or more embodiments. In pen mode the presence of a passive stylus within the sensing region is expected in accordance with one or more embodiments of the invention. Operating in pen mode may cause exclusion regions to be reported, whereas in a different mode (i.e., not pen mode), exclusion regions may not be reported. Pen mode may have other effects beyond the reporting of exclusion regions. For example, in one or more embodiments, pen mode may be entered based on a condition(s) being satisfied. Possible conditions causing pen mode to be entered may include, but not be limited to: launching or executing an application, detecting the presence of a stylus, detecting the presence of multiple input objects, direct input/request from a user, and/or detecting a predetermined gesture or motion.

In Step 210, exclusion region(s) are reported, in accordance with one or more embodiments. The exclusion region(s) may be reported in any suitable format, such as a bitmap with ones representing the excluded region(s), and zeros representing the non-excluded region(s). The exclusion region(s) may be reported to any suitable device or component. In other embodiments, exclusion data may be reported to a host device. Exclusion data may comprise exclusion regions, touch data describing the detected input objects, and other related information. Based on the reported exclusion data, a host device may determine the exclusion region(s). In one or more embodiments, the size of exclusion regions are related to the size of the input object related to the exclusion region, and are also related to the size of the pixels used in the sensing device. In other embodiments, the exclusion region may be calculated by a host device based on touch data provided by the processing system (105) that may be obtained during Step 200.

In Step 215, the exclusion region(s) are displayed, in accordance with one or more embodiments. As indicated by the dotted line, the exclusion region(s) may be displayed by a separate component or application. This may give substantial control over how the exclusion region is displayed to a third party developer, the user, or other suitable entity. As previously noted, other steps may also be performed by a separate component or application. The exclusion region(s) may be displayed on a display or other suitable component. In one or more embodiments, the exclusion regions are viewable on the touchscreen or other sensing region on which the passive stylus is being used. The exclusion region(s) may be displayed in any color or pattern including, but not limited to: grey, black, white, blue, red, green, yellow, purple, stripes, dots, and/or plaid.

In one or more embodiments, the exclusion region(s) may be displayed with a transparency level, such as being partially transparent so that a user may see both the exclusion region and any other information, items, etc., that are "under" the exclusion region. In one or more embodiments, the exclusion region may be displayed as any shape, such as a square, circle, oval, triangle, etc. In one or more embodiments, the shape of the exclusion region is related to the shape of the input object associated with the exclusion region, such as being slightly larger than the shape of the associated input object.

The exclusion region may be displayed as reported in the bitmap or other format. Alternatively, some processing may be performed on the reported bitmap, such as interpolating the edges for a smoother boundary. In one or more embodiments, the exclusion region may change color or size in response to various inputs, such as the input object ceasing to be present on the sensing device. For example, the exclusion region may stay displayed for a few seconds in a different color to indicate to the user that the object causing the exclusion region has been lifted. Additionally, the exclusion region may be visually altered in response to the passive stylus (120) no longer being detected. The processing system (105) may not detect the passive stylus (120) in situations such as the stylus being lifted out of the sensing region or the stylus entering the exclusion region which makes the presence of the stylus difficult to detect due to the proximity of the input object (135). To indicate this, the color, transparency, pattern, etc., of the exclusion region may be altered to alert the user that the stylus is no longer detected. It will be apparent to one of ordinary skill in the art, having the benefit of this disclosure, that there are many ways to display an exclusion region and, as such, the invention should not be limited to the above examples.

The following section describes various examples of the invention. The examples are included to aid in the understanding of the invention and are not intended to limit the scope of the invention.

Figure 3A:
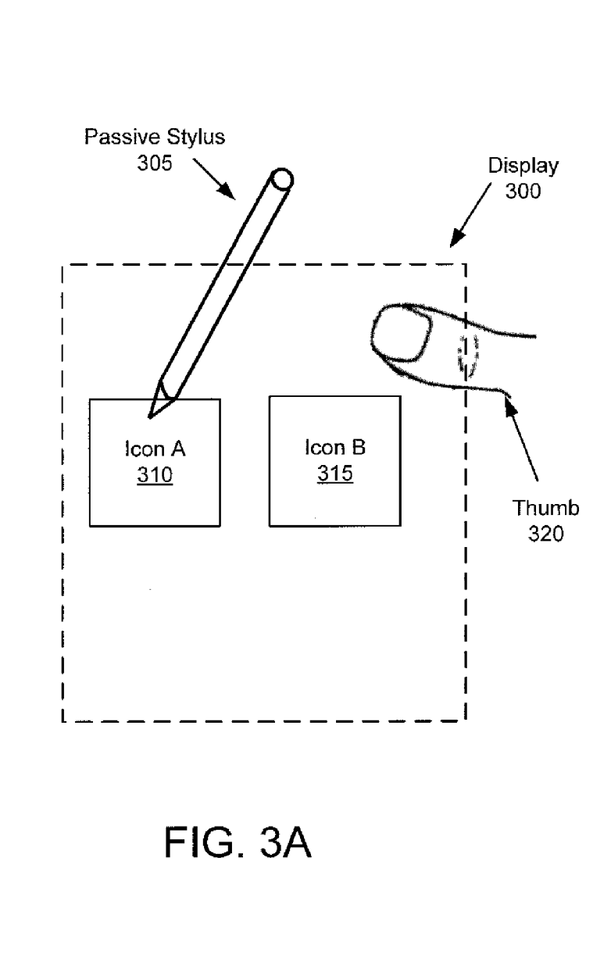
FIGS. 3A-3C show an example in accordance with one or more embodiments of the invention.
Figure 3B:
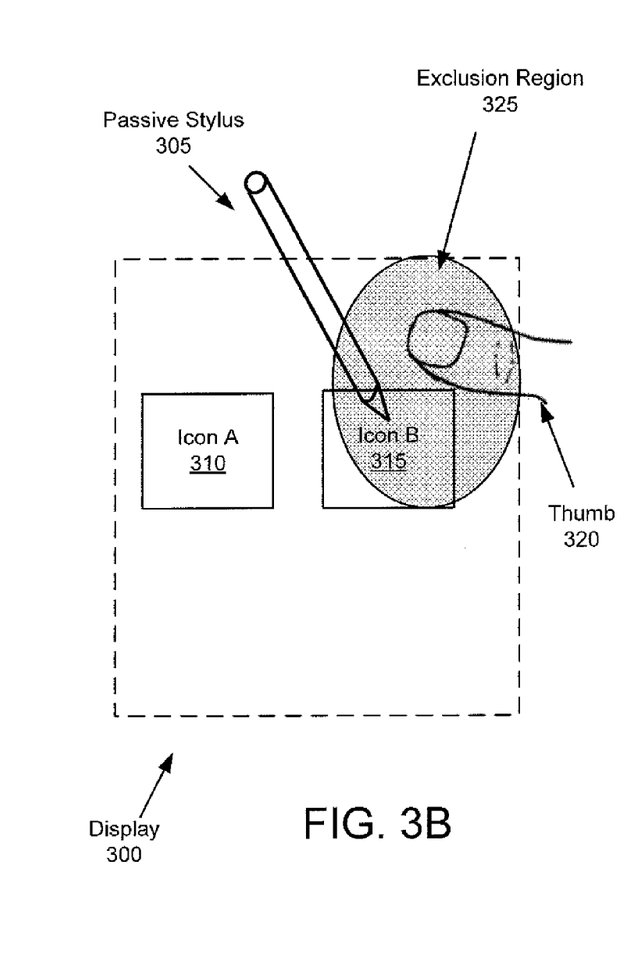
Figure 3C:
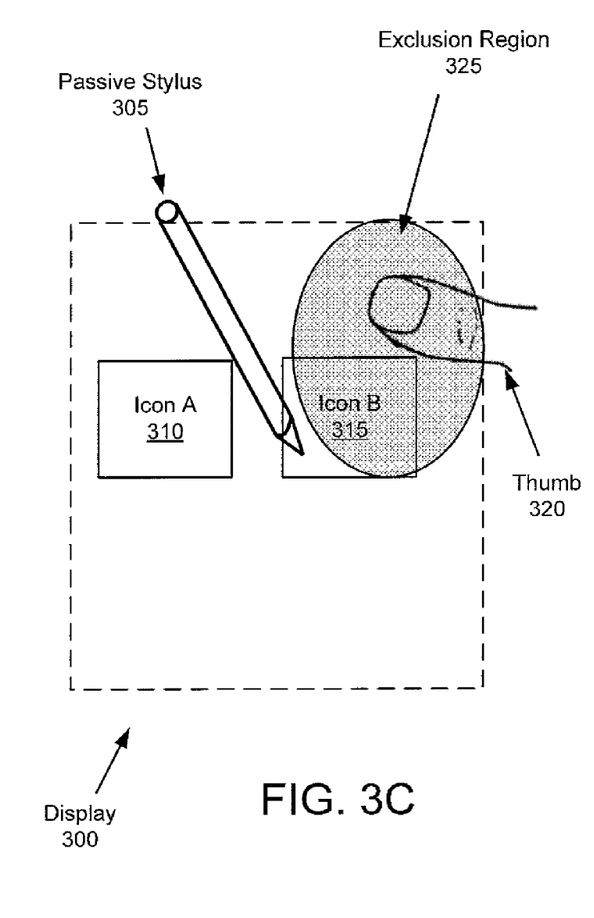

FIGS. 3A-3C show an example of an exclusion region. In FIG. 3A, display (300) is a touchscreen of a cellphone that is displaying icon A (310), and icon B (315). A user is selecting icon A (310) with passive stylus (305), and thumb (320) of the user is also touching the display (300). If the user were to try and use passive stylus (305) near thumb (320), the passive stylus (305) may not be detected correctly. In response to the selection of icon A (310), the device enters into pen mode which causes exclusion regions to be reported. The example continues in FIG. 3B.

In FIG. 3B, display (300) is still displaying icon A (310) and icon B (315), and the user has not moved thumb (320). However, since the cellphone is now in pen mode, exclusion region (325) is now also being shown on display (300) around thumb (320). In other embodiments, the exclusion region may be displayed prior to selection of icon A (310), i.e., pen mode may be entered for various other reasons as previously described. Exclusion region (325) shows the user where there is diminished, or no, detectability of the passive stylus (305). Thus, when the user moves passive stylus (305) over to select icon B (315) within the exclusion region (325), icon B (315) is not selected and the user is easily able to understand why—the cellphone is unable to detect the presence of passive stylus (305). Thus, the user is able to adjust their behavior as shown in FIG. 3C.

In FIG. 3C, display (300) is still displaying icon A (310), icon B (315), and exclusion region (325), and the user has still not moved thumb (320). However, since the user is able to understand why he or she was unable to select icon B (315) in FIG. 3B, the user is able to move passive stylus (305) to a small portion of icon B (315) that is not covered by exclusion region (325), and is therefore able to successfully select icon B (315). Additionally, in some embodiments, it should be noted that as the thumb (320) moves around the touch screen, the corresponding exclusion region (325) also changes locations in order to properly depict the current area of the sensing region in which detectability of the passive stylus would be diminished or non-existent.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A processing system for a capacitive sensing device, comprising:
    a sensor module comprising sensor circuitry configured to be coupled to a plurality of sensor electrodes, the sensor module configured to drive the plurality of sensor electrodes for capacitive sensing; and a determination module configured to:
detect a first input object and a second input object in a sensing region of the capacitive sensing device;
enter a pen mode based on detecting a first condition; and
determine, responsive to entering the pen mode, exclusion data based on at least the second input object,
wherein an exclusion region is displayed by a host device, the exclusion region based on the exclusion data and comprising a portion of the sensing region with diminished detectability of the first input object,
wherein the exclusion region is displayed, to be viewable by a user, as a partially transparent area on a display of the host device, and
wherein the exclusion region is influenced by a size and strength of the second input object, and a layout of the plurality of sensor electrodes.

2. The processing system of claim 1, wherein the second input object is a hand of the user.

3. The processing system of claim 1, wherein the first input object is a passive pen.

4. The processing system of claim 1, wherein the first condition is a determination that the first input object is a passive pen.

5. The processing system of claim 1, wherein the condition is a launch of an application on the host device or an event occurring on the host device.

6. An input device system, comprising:
a display device;
a plurality of sensor electrodes; and
a processing system, the processing system coupled to the sensor electrodes and the display device, the processing system configured to:
drive the plurality of sensor electrodes to detect a first input object and a second input object in a sensing region;
enter a pen mode based on detecting a first condition;
determine, responsive to entering the pen mode, exclusion data based on at least the second input object; and
output an exclusion region on the display device, the exclusion region based on the exclusion data and comprising a portion of the sensing region with diminished detectability of the first input object, wherein the exclusion region is displayed, to be viewable by a user, as a partially transparent area on a display of the display device, and
wherein the exclusion region is influenced by a size and strength of the second input object, and a layout of the plurality of sensor electrodes.

7. The input device system of claim 6, wherein the second input object is a hand of the user.

8. The input device system of claim 6, wherein first input object is a passive pen.

9. The input device system of claim 6, wherein the first condition is a determination that the first input object is a passive pen.

10. The input device system of claim 6, wherein the first condition is a launch of an application or an event occurring on the display device.

11. A method for capacitive sensing, comprising:
detecting a first input object and a second input object in a sensing region of a capacitive sensing device;
entering a pen mode based on detecting a first condition; and
determining, responsive to entering the pen mode, exclusion data based on at least the second input object,
wherein an exclusion region is displayed by a host device, the exclusion region based on the exclusion data and comprising a portion of the sensing region with diminished detectability of the first input object while in the pen mode,
wherein the exclusion region is displayed, to be viewable by a user, as a partially transparent area on a display of the host device, and
wherein the exclusion region is influenced by a size and strength of the second input object, and a layout of the plurality of sensor electrodes.

12. The method of claim 11, wherein the exclusion data comprises the exclusion region.

13. The method of claim 11, further comprising:
reporting the exclusion data to the host device, the host device configured to determine the exclusion region based on the exclusion data.

14. The method of claim 11, wherein the first input object is a passive pen.

15. The method of claim 11, wherein the first condition is a determination that the first input object is a passive pen.

* * * * *